No. 811,187. PATENTED JAN. 30, 1906.
W. S. WARD.
HOOK.
APPLICATION FILED MAY 17, 1905.
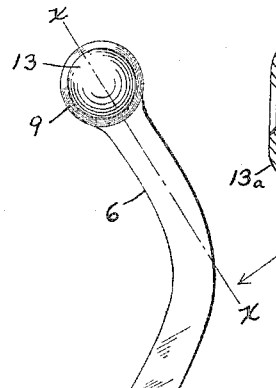
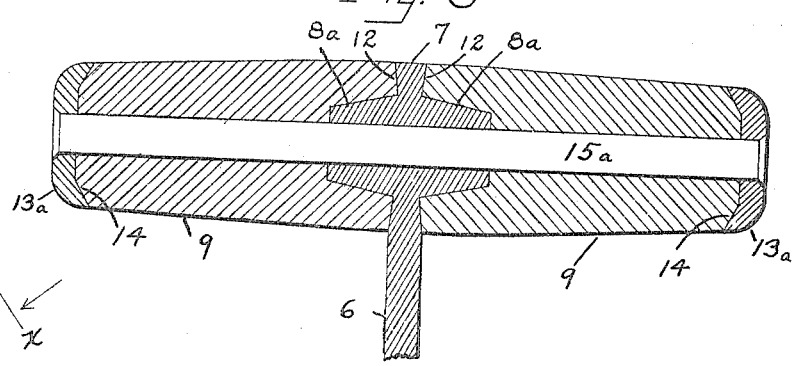
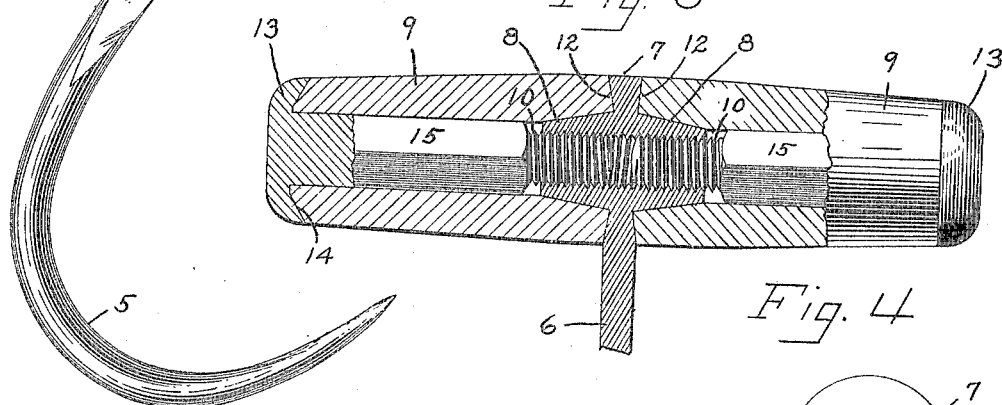
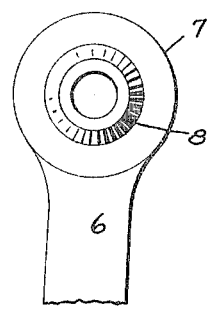
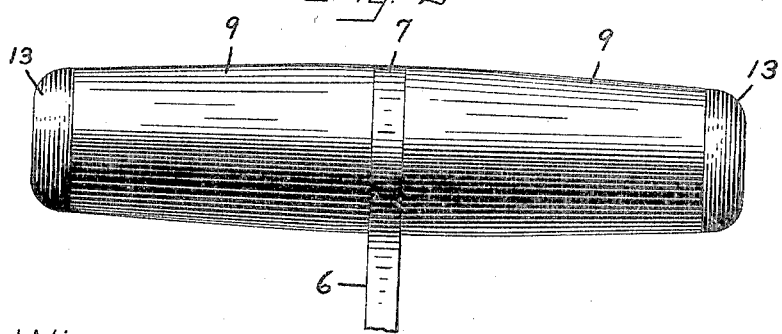
Witnesses.
Fred E. Potter.
P. J. Egan.
Inventor.
William S. Ward.
By James Shepard.
Atty.

UNITED STATES PATENT OFFICE.

WILLIAM S. WARD, OF PLANTSVILLE, CONNECTICUT, ASSIGNOR TO H. D. SMITH & COMPANY, OF PLANTSVILLE, CONNECTICUT, A CORPORATION.

HOOK.

No. 811,187.          Specification of Letters Patent.          Patented Jan. 30, 1906.

Application filed May 17, 1905. Serial No. 260,873.

*To all whom it may concern:*

Be it known that I, WILLIAM S. WARD, a citizen of the United States, residing at Plantsville, in the county of Hartford and State of Connecticut, have invented certain new and useful Improvements in Hooks, of which the following is a specification.

My invention relates to improvements in hooks for handling boxes, bales, and the like; and the objects of my improvement are simplicity and economy in construction and at the same time to produce an efficient article, especially with reference to a firm and substantial connection of the handle with the shank of the hook.

In the accompanying drawings, Figure 1 is a side elevation of my hook. Fig. 2 is an enlarged edge view of a portion of the shank of the hook, together with the handle in side elevation. Fig. 3 is a sectional elevation of the handle and portion of the shank on the line $x\ x$ of Fig. 1. Fig. 4 is a side view of the head of the shank, the handle and handle-rod being removed; and Fig. 5 is a sectional elevation corresponding with Fig. 3 and showing a modification.

The main portion 5 of the hook may be of any ordinary form, and so, also, may all of the shank 6 except its head 7 and hubs or bosses 8. I have shown the hook with a handle which is round in cross-section or end view, and this is the preferred form. The head 7 is of a plate-like form of the same size and form when viewed as in Fig. 4 as the largest part of the handle-woods 9 and of about the same thickness at its edge as the flattened shank 6. In the center of this head 7 on each of its broad sides I form a conical-shaped boss 8, the said bosses constituting a part of the complete head. I prefer to form the sides of the head outside of the bosses with slight concave recesses, or, in other words, I make the head thicker at the periphery than it is at the junction of the bosses, as shown in Fig. 3. The main portion of the hook 5, shank 6, head 7, and the bosses 8 are all forged in one piece of metal. The bosses are drilled or punched and then threaded to receive the threaded ends 10 of the two-part handle-rod. The body 15 of each part of the handle-rod is preferably made square in cross-section, so as to prevent the handle-woods 9 from rotating, and the outer end is provided with a flange or cap 13. The handle-woods may be of wood or analogous light material and are perforated axially to receive the handle-rod and counterbored at the end which faces the head, so as to receive the bosses. The inner ends of the handle-woods are also slightly beveled, as at 12, Fig. 3, to make them fit the overhanging or undercut sides of the head 7. There are two of these handle-woods, one on each side of the head. I prefer to make the inner face of the caps or flanges of an undercut form, as shown in Fig. 3, and to correspondingly bevel the ends of the handle-woods, so as to slightly enter the side of the caps or flanges, as shown at 14, Fig. 3. Thus forming the ends of the handle-woods and abutting faces therefor so that said ends slightly enter the caps and head has a tendency to prevent the handle-woods from splitting and gives them a neat and substantial form. The holes through the handle-woods should be square. The two parts of the handle-rods are first inserted through the handle-woods and then their threaded ends are firmly screwed into the bosses, as shown in Fig. 3, the said two parts then forming the handle-rod. In Fig. 5 the same shank 6 and head 7 are employed, only the bosses $8^a$ are not threaded, and may be punched or broached out to a square form to receive the one-part handle-rod $15^a$. The handle-woods 9 are the same as before, and washers $13^a$, riveted on the outer ends of the handle-rod, take the place of the caps at the outer ends of the two-part handle-rod. In both forms the construction is simple and inexpensive for a good article and the shank and handle are firmly and durably connected.

I claim as my invention—

1. A hook having a flattened shank and an integral head of the same size and form in side view as the adjacent portion of the handle, bosses on the sides of the said head, a handle-rod mounted in the said bosses, and handle-woods secured upon the said handle-rod on the opposite sides of the said head.

2. A hook having a shank and a head integral with the said shank, a handle-rod mounted in the said head and projecting in both directions therefrom, handle-woods mounted on the said handle-rod on each side of the said head, and caps on the ends of the said handle-rod to hold the said woods in place, the sides of the said head and caps being undercut and the ends of the handle-woods beveled to set into the said undercut sides.

3. A hook having a flattened shank and a head of the same size and form in side view as the adjacent portion of the handle, bosses on the sides of the said head having threaded holes, a two-part handle-rod, each part having one end screw-threaded to fit into the said bosses, and having a cap at its other end, and handle-woods secured upon the two parts of the said handle-rod.

WILLIAM S. WARD.

Witnesses:
 JAMES SHEPARD,
 FRED. E. POTTER.